United States Patent
Israel

[19]

[11] Patent Number: 5,907,284
[45] Date of Patent: May 25, 1999

[54] GAS CAP REMOVAL ALERT SYSTEM

[76] Inventor: Ehi R. Israel, 810 Airway SW., Albuquerque, N.M. 87105

[21] Appl. No.: 08/988,835

[22] Filed: Dec. 11, 1997

[51] Int. Cl.$^6$ .................................................. G08B 21/00
[52] U.S. Cl. .................. 340/686.1; 340/426; 340/691.1; 340/693.5; 340/693.9; 220/202; 180/286
[58] Field of Search ................................ 340/425.5, 426, 340/686.1, 691.1, 693.5, 693.9; 220/86.2, 202, 303; 180/286

[56] References Cited

U.S. PATENT DOCUMENTS

| | | | |
|---|---|---|---|
| 3,740,712 | 6/1973 | Borgese et al. | 340/426 |
| 4,034,337 | 7/1977 | Haddock | 340/426 |
| 4,583,072 | 4/1986 | Matsushita | 340/686 |
| 5,096,154 | 3/1992 | Ellis | 248/683 |

*Primary Examiner*—Daniel J. Wu

[57] ABSTRACT

A gas cap removal alert system is provided including a gas tank input mounted on a vehicle. The gas tank input includes a pipe with a threaded inner periphery defining an opening with a circular peripheral edge. A gas cap is included for being removably coupled within the gas tank input. A battery is situated within an interior space of the gas cap. Further provided is an indication mechanism mounted on the gas cap and adapted to alert a user upon the receipt of power. A switch is mounted on the gas cap and further electrically connected between the indication mechanism and the battery. During use, the push button switch has a first orientation for allowing the transfer of power to the indication mechanism and a second orientation for precluding the transfer of power to the indication mechanism upon the coupling of the gas cap within the gas tank input.

8 Claims, 2 Drawing Sheets

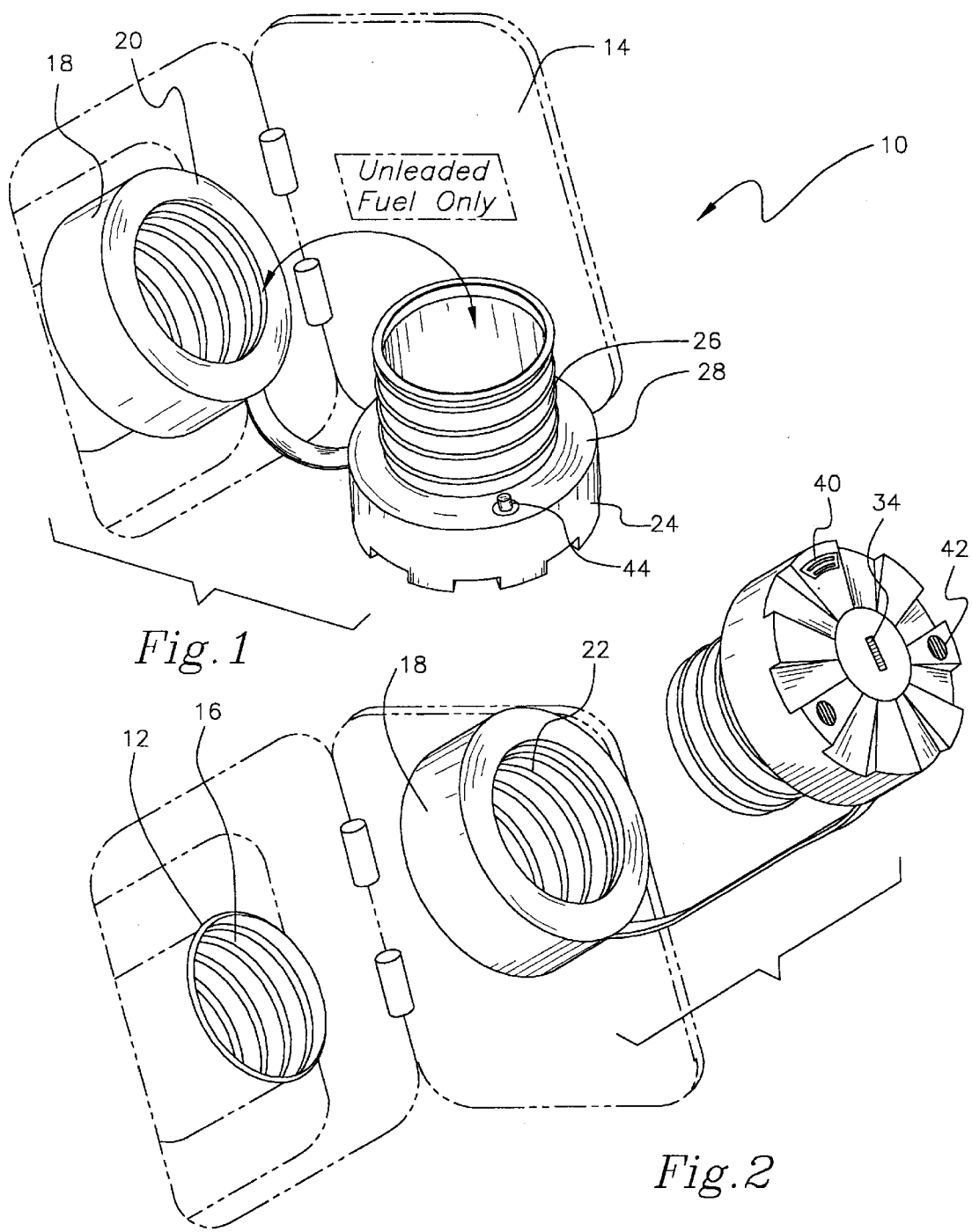

GAS CAP REMOVAL ALERT SYSTEM

BACKGROUND OF THE INVENTION

1. Field of the Invention

The present invention relates to gas caps and more particularly pertains to a new gas cap removal alert system for reminding a user that a gas cap is removed from a gas tank input.

2. Description of the Prior Art

The use of gas caps is known in the prior art. More specifically, gas caps heretofore devised and utilized are known to consist basically of familiar, expected and obvious structural configurations, notwithstanding the myriad of designs encompassed by the crowded prior art which have been developed for the fulfillment of countless objectives and requirements.

Known prior art gas caps include U.S. Pat. No. 5,000,339; U.S. Pat. No. 4,053,083; U.S. Pat. No. 4,562,709; U.S. Pat. No. 4,583,072; U.S. Pat. No. 4,784,423; and U.S. Pat. Des. 320,562.

In these respects, the gas cap removal alert system according to the present invention substantially departs from the conventional concepts and designs of the prior art, and in so doing provides an apparatus primarily developed for the purpose of reminding a user that a gas cap is removed from a gas tank input.

SUMMARY OF THE INVENTION

In view of the foregoing disadvantages inherent in the known types of gas caps now present in the prior art, the present invention provides a new gas cap removal alert system construction wherein the same can be utilized for reminding a user that a gas cap is removed from a gas tank input.

The general purpose of the present invention, which will be described subsequently in greater detail, is to provide a new gas cap removal alert system apparatus and method which has many of the advantages of the gas caps mentioned heretofore and many novel features that result in a new gas cap removal alert system which is not anticipated, rendered obvious, suggested, or even implied by any of the prior art gas caps, either alone or in any combination thereof.

To attain this, the present invention generally comprises a gas tank input mounted on a rear extent of a side of the vehicle. A door is hingably mounted adjacent to the gas tank input for selectively covering the same. The gas tank input further includes a pipe extending from the vehicle with a smooth outer periphery and a threaded inner periphery defining an opening with a circular peripheral edge. FIGS. 1 & 2 show a mounting sleeve having a cylindrical configuration with a planar front face with an annular configuration and a planar rear face with an annular configuration. The mounting sleeve further has a periphery with a smooth outer surface and a threaded inner surface. By this structure, the inner surface of the mounting sleeve may be screwably coupled to the circular peripheral edge of the gas tank input for encompassing the outer periphery thereof. Further provided is a gas cap including an inboard portion with a cylindrical configuration, a first diameter and a first thickness. The inboard portion includes a threaded outer surface. The gas cap further has a hollow outboard portion coupled in concentric relationship with the inboard extent. The outboard portion is equipped with a disk-shaped configuration, a second diameter greater than the first diameter and a second thickness less than the first thickness. Note FIGS. 1 & 2. During use, the outboard portion may be handled to removably screw the inboard portion within the gas tank input. When screwably coupled, the front face of the mounting sleeve abuts with an inner face of the outboard portion of the gas cap for reasons that will become apparent hereinafter. An outer surface of the outboard portion has a key hole mounted thereon for allowing the insertion of a key therein. The key hole and key are adapted for locking the gas cap within the gas tank input upon the rotation and removal of the key from the key hole. Also included is a thin flexible plastic coupling strip having a first end integrally coupled to the outer surface of the mounting sleeve. A second end of the coupling strip is integrally coupled to the periphery of the outboard portion of the gas cap. Situated within an interior space of the outboard portion of the gas cap is a battery. A light is mounted on the outer surface of the outboard portion of the gas cap for emitting light upon the receipt of power. Associated therewith is an audio means, in the form of a piezo electric buzzer, mounted on the outer surface of the outboard portion of the gas cap. The buzzer is adapted for emitting an audible sound upon the receipt of power. A push button switch is mounted on the inner surface of the outboard portion of the gas cap, as shown in FIG. 1. Such switch is further electrically connected between the light and audio means and the battery. In operation, the push button switch has an unbiased extended orientation for allowing the transfer of power to the light and the audio means. In such orientation, the audio means and light remind a user to screw the cap to the gas tank input. Further, the switch has a biased depressed orientation for precluding the transfer of power to the light and the audio means. It should be noted that the switch remains in the biased depressed orientation only during the screwable coupling of the gas cap within the gas tank input.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gas cap removal alert system apparatus and method which has many of the advantages of the gas caps mentioned heretofore and many novel features that result in a new gas cap removal alert system which is not anticipated, rendered obvious, suggested, or even implied by any of the prior art gas caps, either alone or in any combination thereof.

It is another object of the present invention to provide a new gas cap removal alert system which may be easily and efficiently manufactured and marketed.

It is a further object of the present invention to provide a new gas cap removal alert system which is of a durable and reliable construction.

An even further object of the present invention is to provide a new gas cap removal alert system which is susceptible of a low cost of manufacture with regard to both materials and labor, and which accordingly is then susceptible of low prices of sale to the consuming public, thereby making such gas cap removal alert system economically available to the buying public.

Still yet another object of the present invention is to provide a new gas cap removal alert system which provides in the apparatuses and methods of the prior art some of the advantages thereof, while simultaneously overcoming some of the disadvantages normally associated therewith.

Still another object of the present invention is to provide a new gas cap removal alert system for reminding a user that a gas cap is removed from a gas tank input.

Even still another object of the present invention is to provide a new gas cap removal alert system that includes including a gas tank input mounted on a vehicle. The gas tank input includes a pipe with a threaded inner periphery defining an opening with a circular peripheral edge. A gas cap is included for being removably coupled within the gas tank input. A battery is situated within an interior space of the gas cap. Further provided is an indication mechanism mounted on the gas cap and adapted to alert a user upon the receipt of power. A switch is mounted on the gas cap and further electrically connected between the indication mechanism and the battery. During use, the push button switch has a first orientation for allowing the transfer of power to the indication mechanism and a second orientation for precluding the transfer of power to the indication mechanism upon the coupling of the gas cap within the gas tank input.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new gas cap removal alert system according to the present invention.

FIG. 2 is a perspective view of the present invention with the mounting sleeve removed.

DESCRIPTION OF THE PREFERRED EMBODIMENT

Figure 3:
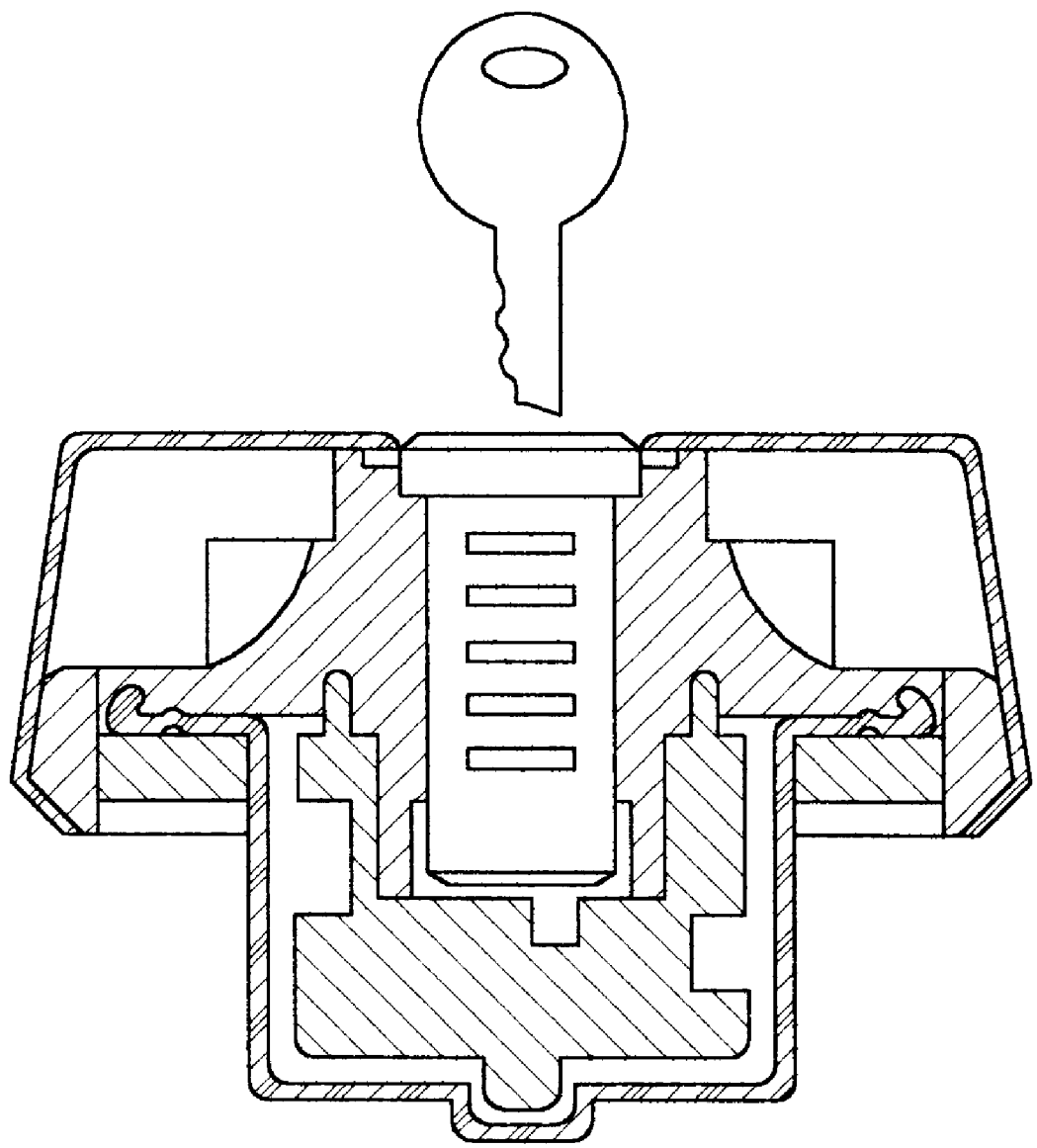
FIG. 3 is a cross-sectional view of a prior art key hole mechanism for locking the gas cap to the gas tank input.

With reference now to the drawings, and in particular to FIGS. 1 through 3 thereof, a new gas cap removal alert system embodying the principles and concepts of the present invention and generally designated by the reference numeral 10 will be described.

The present invention, as designated as numeral 10, includes a gas tank input 12 mounted on a rear extent of a side of the vehicle. A door 14 is hingably mounted adjacent to the gas tank input for selectively covering the same. The gas tank input further includes a pipe 16 extending from the vehicle with a smooth outer periphery and a threaded inner periphery defining an opening with a circular peripheral edge.

FIGS. 1 & 2 show a mounting sleeve 18 having a cylindrical configuration with a planar front face 20 with an annular configuration and a planar rear face with an annular configuration. The mounting sleeve further has a periphery with a smooth outer surface and a threaded inner surface 22. By this structure, the inner surface of the mounting sleeve may be screwably coupled to the circular peripheral edge of the gas tank input for encompassing the outer periphery thereof. Preferably, the circular peripheral edge extends radially outwardly to engage the threads of the mounting sleeve.

Further provided is a gas cap 24 including an inboard portion 26 with a cylindrical configuration, a first diameter and a first thickness. The inboard portion includes a threaded outer surface. The gas cap further has a hollow outboard portion 28 coupled in concentric relationship with the inboard extent. The outboard portion is equipped with a disk-shaped configuration, a second diameter greater than the first diameter and a second thickness less than the first thickness. Note FIGS. 1 & 2.

During use, the outboard portion may be handled to removably screw the inboard portion within the gas tank input. When screwably coupled, the front face of the mounting sleeve abuts with an inner face of the outboard portion of the gas cap, for reasons that will become apparent hereinafter. An outer surface of the outboard portion has a key hole 34 mounted thereon for allowing the insertion of a key therein. The key hole and key are adapted for locking the gas cap within the gas tank input upon the rotation and removal of the key from the key hole.

Also included is a thin flexible plastic coupling strip 36 having a first end integrally coupled to the outer surface of the mounting sleeve. A second end of the coupling strip is integrally coupled to the periphery of the outboard portion of the gas cap.

Situated within an interior space of the outboard portion of the gas cap is a battery. A light 40 is mounted on the outer surface of the outboard portion of the gas cap for emitting light upon the receipt of power. Associated therewith is an audio means 42, in the form of a piezo electric buzzer, mounted on the outer surface of the outboard portion of the gas cap. The buzzer is adapted for emitting an audible sound upon the receipt of power.

A push button switch 44 is mounted on the inner surface of the outboard portion of the gas cap, as shown in FIG. 1. Such switch is further electrically connected between the light and audio means and the battery.

In operation, the push button switch has an unbiased extended orientation for allowing the transfer of power to the light and the audio means. In such orientation, the audio means and light remind a user to screw the cap to the gas tank input. Further, the switch has a biased depressed orientation for precluding the transfer of power to the light and the audio means. It should be noted that the switch remains in the biased depressed orientation only during the screwable coupling of the gas cap within the gas tank input.

In an alternate embodiment wherein the gas tank input fails to have a protruding pipe, the mounting sleeve and coupling sleeve may be excluded. Instead, a magnetic ring may be situated about a periphery of the inboard portion of the gas cap for being removably coupled to the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gas cap removal alert system comprising, in combination:

a gas tank input mounted on a rear extent of a side of the vehicle with a door hingably mounted adjacent thereto for selectively covering the same, the gas tank input including a pipe extending from the vehicle with a smooth outer periphery, and a threaded inner periphery defining an opening with a circular peripheral edge;

a mounting sleeve having a cylindrical configuration with a planar front face with an annular configuration, a planar rear face with an annular configuration and a periphery with a smooth outer surface and a threaded inner surface, whereby the inner surface of the mounting sleeve may be screwably coupled to the circular peripheral edge of the gas tank input for encompassing the outer periphery thereof;

a gas cap including an inboard portion with a cylindrical configuration, a first diameter and a first thickness, the inboard portion including a threaded outer surface, the gas cap further including a hollow outboard portion coupled in concentric relationship with the inboard extent with a disk-shaped configuration, a second diameter greater than the first diameter and a second thickness less than the first thickness, wherein the outboard portion may be handled to removably screw the inboard portion within the gas tank input thereby abutting the front face of the mounting sleeve with an inner face of the outboard portion of the gas cap, an outer surface of the outboard portion having key hole mounted thereon for allowing the insertion of a key therein for locking the gas cap within the gas tank input upon the rotation and removal thereof;

a thin flexible plastic coupling strip having a first end integrally coupled to the outer surface of the mounting sleeve and a second end integrally coupled to the periphery of the outboard portion of the gas cap;

a battery situated within an interior space of the outboard portion of the gas cap;

a light mounted on the outer surface of the outboard portion of the gas cap for emitting light upon the receipt of power;

an audio means mounted on the outer surface of the outboard portion of the gas cap for emitting an audible sound upon the receipt of power; and a push button switch mounted on the inner surface of the outboard portion of the gas cap and further electrically connected between the light and audio means and the battery, the push button switch having an unbiased extended orientation for allowing the transfer of power to the light and the audio means and a biased depressed orientation for precluding the transfer of power to the light and the audio means upon the screwable coupling of the gas cap within the gas tank input.

2. A gas cap removal alert system comprising:

a gas tank input mounted on a vehicle, the gas tank input including a pipe with a threaded inner periphery defining an opening with a circular peripheral edge;

a gas cap for being removably coupled within the gas tank input;

a battery situated within an interior space of the gas cap;

indication means mounted on the gas cap and adapted to alert a user upon the receipt of power; and a switch mounted on the gas cap and further electrically connected between the indication means and the battery, the push button switch having a first orientation for allowing the transfer of power to the indication means and a second orientation for precluding the transfer of power to the indication means upon the coupling of the gas cap within the gas tank input.

3. A gas cap removal alert system as set forth in claim 2 wherein the indication means includes a light mounted on the gas cap for emitting light upon the receipt of power.

4. A gas cap removal alert system as set forth in claim 2 wherein the indication means includes an audio means mounted on the gas cap for emitting an audible sound upon the receipt of power.

5. A gas cap removal alert system as set forth in claim 2 wherein the switch is a push button switch with the first orientation being unbiased and extended and the second orientation being biased and depressed.

6. A gas cap removal alert system as set forth in claim 2 wherein the switch is mounted on an inner surface of an outboard portion of the gas cap.

7. A gas cap removal alert system as set forth in claim 6 wherein further included is a mounting sleeve coupled to the gas input pipe for abutting the switch.

8. A gas cap removal alert system as set forth in claim 7 and further including a coupling strip connected between the mounting sleeve and the gas cap.

* * * * *